Figure 5:
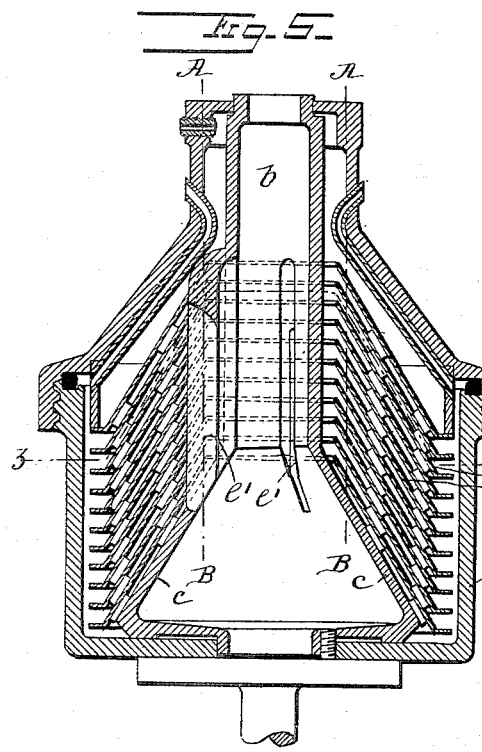

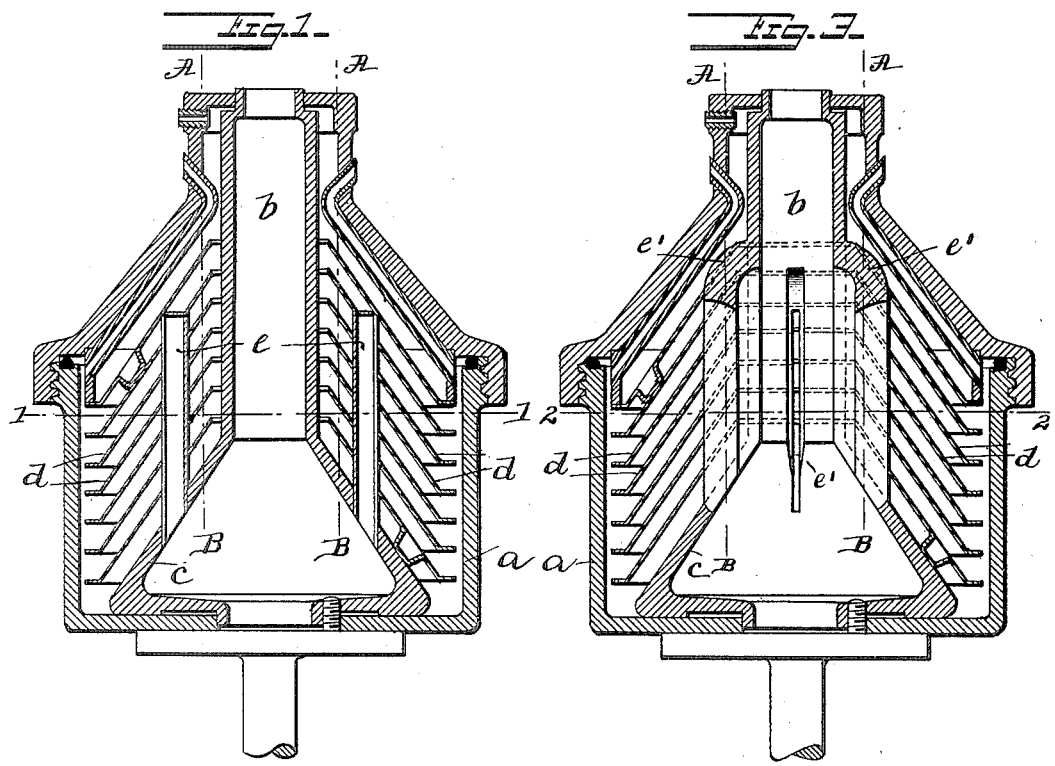
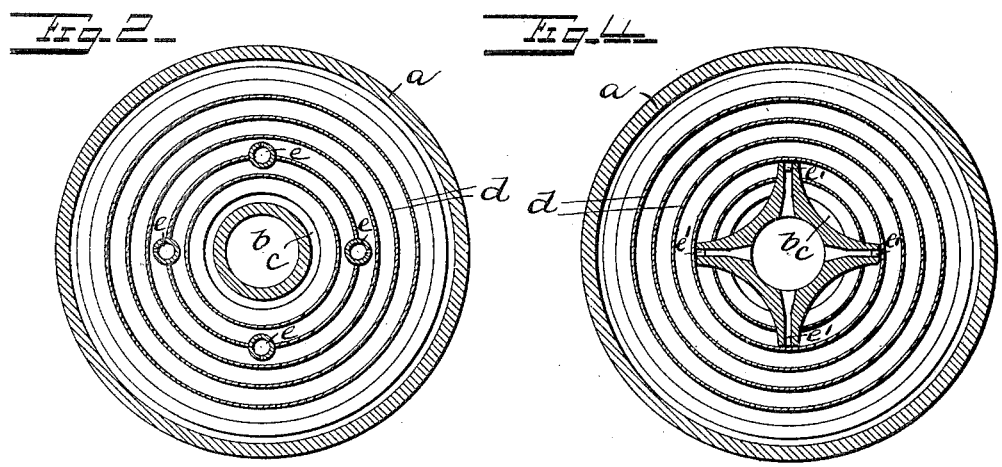

No. 640,358.  
J. J. BERRIGAN.  
CENTRIFUGAL CREAM SEPARATOR.  
(Application filed Apr. 29, 1898.)  
Patented Jan. 2, 1900.

(No Model.) 2 Sheets—Sheet 2.

Witnesses.  
Jesse B. Heller  
Frank S. Busser

Inventor.  
Joseph Berrigan  
Attorney.

UNITED STATES PATENT OFFICE.

JOHN JOSEPH BERRIGAN, OF STOCKHOLM, SWEDEN, ASSIGNOR TO THE AKTIEBOLAGET SEPARATOR, OF SAME PLACE.

CENTRIFUGAL CREAM-SEPARATOR.

SPECIFICATION forming part of Letters Patent No. 640,358, dated January 2, 1900.

Application filed April 29, 1898. Serial No. 679,164. (No model.)

*To all whom it may concern:*

Be it known that I, JOHN JOSEPH BERRIGAN, engineer, a citizen of the United States, residing at Stockholm, Sweden, have invented certain new and useful Improvements in Centrifugal Cream-Separators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in that class of centrifugal creamers in which in the liquid space of the bowl there is a division contrivance of such form or so placed as to cross the radial lines, so as to thus divide the liquid in the bowl into lamina or strata, such as is shown in United States Letters Patent No. 432,719, dated July 22, 1890.

The object of the invention is to effect a uniform distribution of the whole milk throughout all the compartments formed by the division contrivances and to hinder or prevent the entering whole milk from mixing with any part of the wholly or partly separated cream already in the bowl, and thus to increase the effectiveness of the separation.

My invention consists, first, in admitting the whole milk into the several compartments formed by the division contrivance through orifices located at such position between the center line of the bowl and the periphery thereof that they will open into the "neutral zone"—that is, the zone located outside the wall of cream and within the wall of skimmed milk and containing liquid of specific gravity approximating that of the whole milk formed by the separating action during the rotation of the bowl.

The invention also consists in such a construction and arrangement of the division contrivance with respect to the inlet-orifices that the whole milk entering any particular compartment through the orifice located opposite or within said compartment will be confined therein substantially throughout the whole of the separating operation and be prevented from immediately commingling with the whole milk in any of the other compartments.

The invention also consists in such a construction and arrangement of the division contrivance with respect to the inlet-orifices that the whole milk will be fed into each compartment at a point between the inner and outer ends of said compartments.

The invention also consists in such an arrangement of the division contrivance that there will be no opening or communication between adjacent compartments at or near the point of introduction of the whole milk into the bowl in order to prevent the whole milk from sinking into the lower compartments and forcing the thickest cream into the upper compartments, which action prevents a uniform distribution and free separation throughout all the compartments.

It has been proposed to effect an improvement in the effectiveness of the bowl by providing vertical tubes or ribs located wholly within the inner ends of the division contrivance and having distributing slots or holes projecting into the bowl about on a line with the inner edges of the division contrivance. Such an arrangement does not accomplish the results aimed at, for the reason that their only effect is to prevent to an imperfect extent the intermingling of the whole milk with the extreme inner layer of pure cream that has been wholly separated and is moving up to the discharge-orifice. The whole milk, as a matter of fact, is introduced into the division contrivance at such a point that it mixes with an inner layer of liquid either composed wholly of cream or very rich in cream, the cream particles of which are traveling inward toward the annular channel for the separated cream within the inner line of the division contrivance. It is quite obvious that the separation is thereby seriously hindered, as cream wholly or partly separated is being constantly remixed with the entering whole milk, necessitating reseparation and decreasing both the effectiveness and capacity of the bowl. It is obvious, too, that inasmuch as the distributing-orifices are located at or within the inner edge of the division contrivance the distribution of the whole milk will not be as uniform as is desirable, as a proportion of the entering whole milk will sink into the lower compartments through the pure-cream channel. In my invention, while I utilize the broad idea of perforated ribs or pipes for distributing the entering whole milk, I so arrange them that the entering whole milk will enter the neutral zone, where the liquid already in the bowl is of substantially the same specific gravity as the entering whole milk. To be more specific, I arrange the inlet device so that its distributing-orifices are at a distance from the rotating axis greater than the distance from the same axis to the inner edge of the division contrivance, or, in other words, so that the distributing-orifices open into the division contrivance between its inner and outer ends and at such point in the neutral zone as will insure the entering whole milk passing through liquid poorer in fat than the inner layer within the division contrivance, the best results being obtained by so locating the orifices that the whole milk will mix with liquid of substantially the same specific gravity, due allowance being made for the effect of centrifugal force upon the milk ejected through the distributing-orifices. By this construction the entering whole milk is separated into its constituent elements with the greatest economy, as the cream passes inward and the milk outward respectively toward the inner and outward extremities of the division contrivance without interference from the constantly-entering full milk and without mixing with the milk from any other compartment until the separation is completed.

The practical execution of my invention may of course be effected by means of many different constructions, and the several devices shown in the drawings are only to be considered examples of how the invention may be preferably carried out in and applied to some of the known types of centrifugal separators.

I will now describe the preferred embodiment of the invention, which is, in connection with division-plates, such as shown and described in Figures 1 to 5 of the United States Letters Patent No. 432,719, heretofore spoken of, wherein the division-plates consist of a series of superposed disks, each in the form of a frustum of a cone, although unless specifically so claimed I do not intend to limit my invention to the precise form and arrangement of division-plates shown therein.

Figure 7:
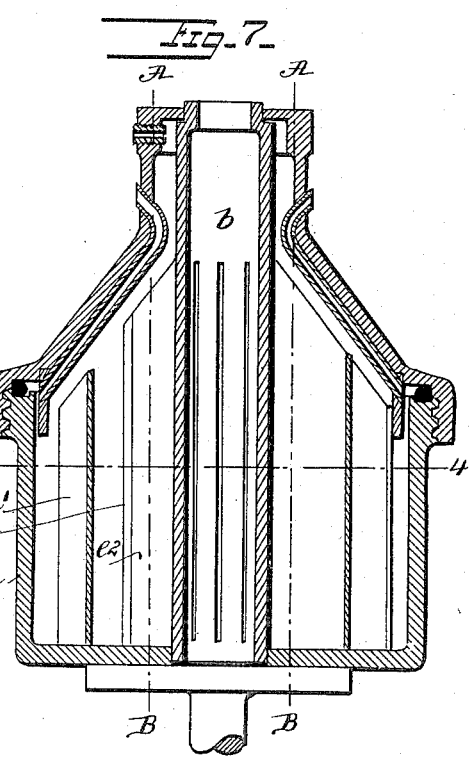
Figure 6:
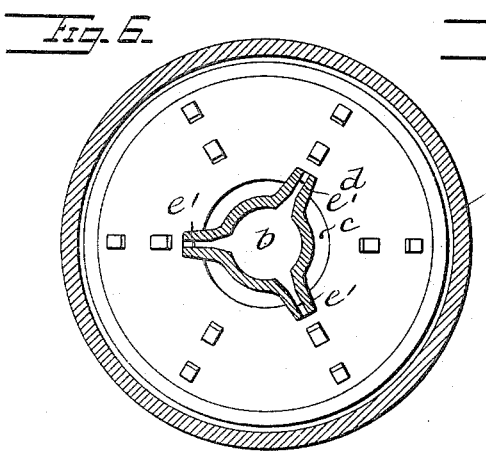
Figure 8:
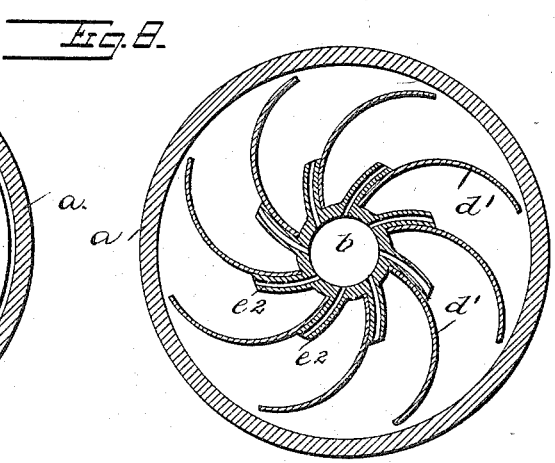

In the drawings, Fig. 1 is a vertical section through the bowl of a centrifugal separator provided with superposed conical disks, according to the device shown and described in Figs. 1 to 5 of the United States Letters Patent No. 432,719. Fig. 2 is a cross-section on the line 1 1, Fig. 1. Fig. 3 is a similar view to Fig. 1 of a modified form; and Fig. 4 is a section on the line 2 2, Fig. 3. Fig. 5 is a vertical section of another modification; and Fig. 6 is a cross-section on line 3 3, Fig. 5. Fig. 7 is a vertical section through the bowl of a centrifugal separator provided with spirally-curved plates arranged vertically in the bowl, according to Figs. 7 and 8 of the above-named United States Letters Patent No. 432,719. Fig. 8 is a section on the line 4 4, Fig. 7.

In Figs. 1 and 2, $a$ is the centrifugal bowl, provided with a central feed-pipe $b$ for the whole milk. The lower end of the said feed-pipe is connected with the slime-collector $c$.

$d$ are the conical disks, dividing the liquid in the bowl into lamina or strata, narrow in the direction of the radius.

From the cover of the slime-collector there extend one or more (on the drawings four are shown) vertical distributing-pipes $e$ through all the conical disks, and these pipes are provided with orifices (on the drawings they are shown as longitudinal narrow slits) on the side turned toward the periphery of the bowl. The position of these orifices within the separating-chamber forms an essential feature of the invention. The orifices in the pipes are situated outside the cream layer during the skimming—that is to say, in what is generally called the "neutral zone." It will also be observed that at or near these orifices there is no chance for communication between adjacent compartments formed by the division contrivance, as the same extend from near the periphery to some distance within the vertical plane of the pipe-orifices, and preferably, as shown in the drawings, to a point within the outer boundary of the cream zone (shown by the dotted lines A B, Fig. 1) formed in the skimming, the division contrivance being cut away in the neutral zone only to an extent necessary to accommodate the pipes. By this arrangement the advantage is gained that the whole milk flowing through the pipes $e$ is not forced to pass through even a part of the cream layer already separated, but is thrown out through the orifices opening into the neutral zone, and by reason of the extension of the division contrivance inwardly to or within the outer limits of the cream zone, and by reason of the confinement of the whole milk from escapement from the upper to the lower compartments at the point of ingress of the whole milk, and by reason of the confinement of the whole milk within the compartment to which it is initially introduced during substantially the whole of the skimming operation, the whole milk will distribute itself uniformly between all the interspaces, and the same separating action will take place in each, the cream passing toward the center and the skim milk toward the outer circumference of the bowl, there being no effective tendency of the whole milk to find its way into the lower interspaces in a greater volume than in the upper interspaces nor any effective tendency of the wall of thick cream to form in the neutral zone in the upper interspaces and obstruct the outward flow of the milk therein, as would be the case if there were an open vertical passage opposite the feeding-orifices or if the said feeding-orifices were located in or within the cream zone. Thus a considerably-increased and more effective working capacity is attained.

In the modified form shown in Figs. 3 and 4 there are no particular pipes e for introducing the whole milk; but the central feed-pipe is here provided with a number (on the drawings four are shown) of ribs $e'$, the height of which corresponds to the height of the division contrivance, (the additional height of all the superposed disks.) These ribs, like the pipes of Figs. 1 and 2, are provided with orifices communicating on the inside with the central feed-pipe and on the outside with the several compartments formed by the disks, the ribs extending outwardly, so that the milk will feed, as in the first-described construction, into the neutral zone outside of the cream wall A B, formed during the rotation of the bowl. The particular form of orifices shown are narrow slits formed by cutting up the ribs in a longitudinal direction and extending radially outward with respect to the bowl. The disks are notched or cut away only to an extent sufficient to accommodate the ribs.

In Figs. 5 and 6 the same device as the latest described is shown; but here the central feed-pipe is provided with only three ribs.

In the device shown in Figs. 7 and 8, wherein the division contrivance consists in spirally-curved plates arranged vertically in the bowl, the whole milk passes through a number of bent ribs $e^2$, provided with narrow slits or openings communicating with the interior of the central feed-pipe and open into the spaces between the curved plates or partitions $d'$. All the openings of these ribs are situated outside the cream wall A B, as stated above, so that the whole milk thrown out through the same is not mixed with the already-separated cream.

As stated before, I do not intend to limit myself to the precise arrangement of feed-orifices or form of division plates or disks as shown in the drawings or the number thereof; but,

Having now fully described my invention, what I claim, and desire to protect by Letters Patent, is—

1. In a centrifugal creamer, the combination with a division contrivance consisting of plates extending from near the periphery of the bowl toward the axis thereof and intersecting both radial horizontal and radial vertical planes of the bowl, of an orificed inlet and distributing device for the whole milk extending vertically through the bowl and opening into the neutral zone of the creamer, between adjacent plates of the division contrivance and between the outer and inner extremities of the division contrivance.

2. In a centrifugal creamer, the combination with a division contrivance consisting of a series of superposed conical division-plates, the said plates extending from near the periphery of the bowl toward the axis thereof to within the cream-zone of the creamer, of an orificed inlet and distributing device extending vertically through and intersecting said plates and opening into the neutral zone of the creamer between adjacent plates of the division contrivance.

3. In a centrifugal creamer, the combination with a division contrivance consisting of plates extending from near the periphery of the bowl toward the axis thereof and intersecting both radial horizontal and radial vertical planes of the bowl, of an orificed inlet and distributing device for the whole milk extending vertically through the bowl and opening into the neutral zone of the creamer, between adjacent plates of the division contrivance and between the outer and inner extremities of the division contrivance, the upper end of said orificed inlet being closed.

In testimony that I claim the foregoing as my invention I have signed my name in presence of two subscribing witnesses.

JOHN JOSEPH BERRIGAN.

Witnesses:
TH. W. AWRINSKY,
M. GENBERG.